United States Patent [19]

Ebata et al.

[11] 4,173,461

[45] Nov. 6, 1979

[54] METHOD OF BENDING GLASS PLATE

[75] Inventors: Yoshihiro Ebata, Kawanishi; Tsutomu Ueno, Ikeda; Nagamasa Kataoka, Kawanishi; Akimasa Akao, Higashi-murayama, all of Japan

[73] Assignees: Agency of Industrial Science and Technology, Tokyo; Central Glass Company, Limited, Ube, both of Japan

[21] Appl. No.: 909,691

[22] Filed: May 25, 1978

[30] Foreign Application Priority Data

May 26, 1977 [JP] Japan ............................... 52-62009

[51] Int. Cl.$^2$ ............................................. C03B 23/02
[52] U.S. Cl. ........................................ 65/106; 65/40; 65/DIG. 4
[58] Field of Search ................. 65/103, 104, 106, 107, 65/273, 275, 288, DIG. 4, 40

[56] References Cited

U.S. PATENT DOCUMENTS

| 2,624,979 | 1/1953 | Clever et al. | 65/40 X |
| 4,056,379 | 11/1977 | Kelly et al. | 65/103 X |

OTHER PUBLICATIONS

Japanese Patent Application No. 47, (1972), 39524.

*Primary Examiner*—Arthur D. Kellogg
*Attorney, Agent, or Firm*—Fleit & Jacobson

[57] ABSTRACT

As a first step to bend a glass along a line traversing the plate, external heat is applied to the glass plate such that a narrow zone containing the entire length of the bending line is heated more intensely than the remaining area to reach a temperature at which the glass does not yet soften but exhibits an appreciable lowering of its electrical resistivity. Then an electric current is caused to flow through the glass in the intensely heated zone from one terminal of the bending line to the other terminal, until the glass is softened only in this zone, i.e. along the bending line by the Joule effect of the current. In this state, desired manner of bending is achieved by the use of a suitably shaped bending die.

7 Claims, 5 Drawing Figures

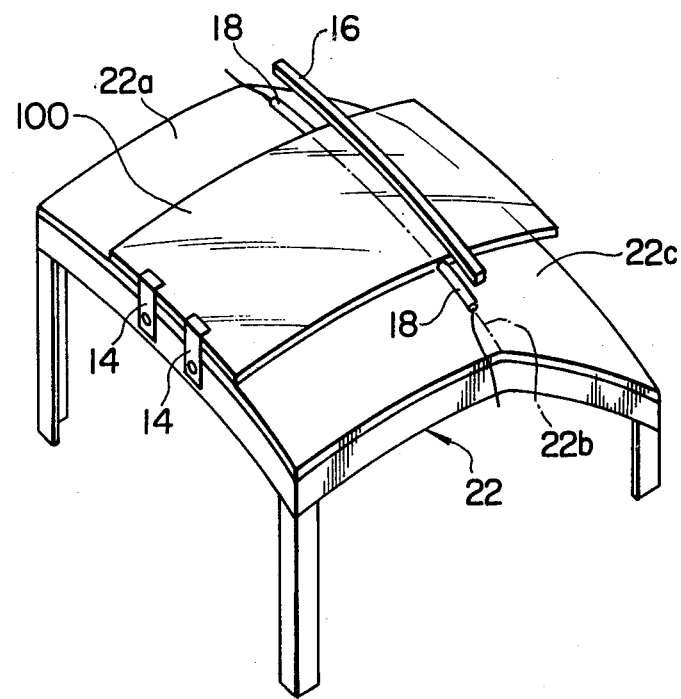
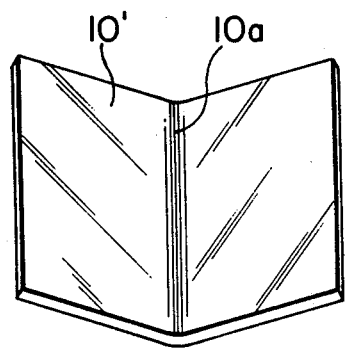
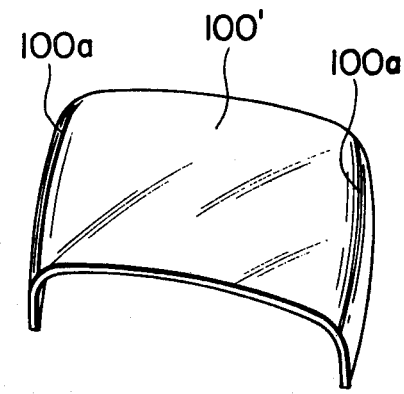

METHOD OF BENDING GLASS PLATE

BACKGROUND OF THE INVENTION

This invention relates to a method of bending a glass plate through heating, particularly, with a small radius of curvature of the bend.

As a typical example of known methods of bending a glass plate with a relatively small radius of curvature of the bend, Japanese Patent Application, Publication No. 45(1970)-28911 proposes to groove a glass plate on an intended bending line and, after heating of the glass plate to soften it in a zone containing the groove, accomplish bending along the groove. From the viewpoint of productivity in industrial applications the need of a machining process for the grooving as a preparatory step is a disadvantage hard to disregard.

Another example is a method disclosed in Japanese Patent Application Ser. No. 47(1972)-39524 now laid open to the public as Disclosure No. 47(1972)-39117. In this method, an electrically conductive paste (containing a metal powder) is applied to the surface of a glass plate so as to provide a conductive layer in the shape of a belt or lane on an intended bending line, and an electric current is made to flow through the conductive layer thereby to heat and soften the glass plate in an area covered with this layer. This method too needs a preparatory process, i.e. the application of the paste. Besides, this method involves a problem that the paste remains fixed to the glass article obtained by bending as an opaque and stained zone, which of course injures the appearance of the article.

SUMMARY OF THE INVENTION

It is an object of the present invention to provide a novel method of bending a glass plate along a line traversing the plate, which method features that the bending can be achieved with a small radius of curvature of the bend, that a glass to be bent needs no pretreatment and that the product is free from defects such as stains and has a good appearance.

According to the invention, the glass plate is provided with a pair of electrodes brought into contact with the glass plate respectively at two terminals of the line along which the bending is intended, and the glass plate is heated in the following manner. First a substantially entire portion of the glass plate is heated so as not to cause softening of the glass plate, and at the same time the glass plate is heated more intensely only in a zone which traverses the glass plate with a narrow width and contains the entire length of the bending line by the use of a heater arranged at a short distance from the glass plate to radiate heat along the bending line such that only this zone of the glass plate is heated to a temperature at which the glass plate does not yet soften but exhibits an appreciable lowering of its electrical resistivity. Then a voltage is applied to the electrodes to cause an electric current to flow between the electrodes through the intensely heated zone of the glass plate, while the above described heating is continued, such that only this zone of the glass plate is further heated by the Joule effect of the current and softened. While the aforementioned zone remains softened, the glass plate is bent so as to give a bend along the aforementioned line which is contained in the softened zone.

This method has the advantage that the glass plate needs no treatment prior to a heating process for softening and accordingly gives a product of good appearance with high productivity. As another advantage of this method, the bending can be achieved with a very small radius of curvature of the resultant bend because only a very narrow zone of the glass plate is softened.

This method is practicable whether the intended bending line is straight or curved. The bending can be accomplished in a manner as designed by heating and locally softening the glass plate on a suitably designed bending die.

BRIEF DESCRIPTION OF THE DRAWINGS

FIG. 3 is a perspective view of a glass-bending apparatus which is fundamentally similar to the apparatus of FIG. 1 but is adapted for bending of a curved glass plate; and FIGS. 4 and 5 are respectively perspective views of two examples of glass objects obtained by a method of the invention.

DESCRIPTION OF PREFERRED EMBODIMENTS

Figure 1:
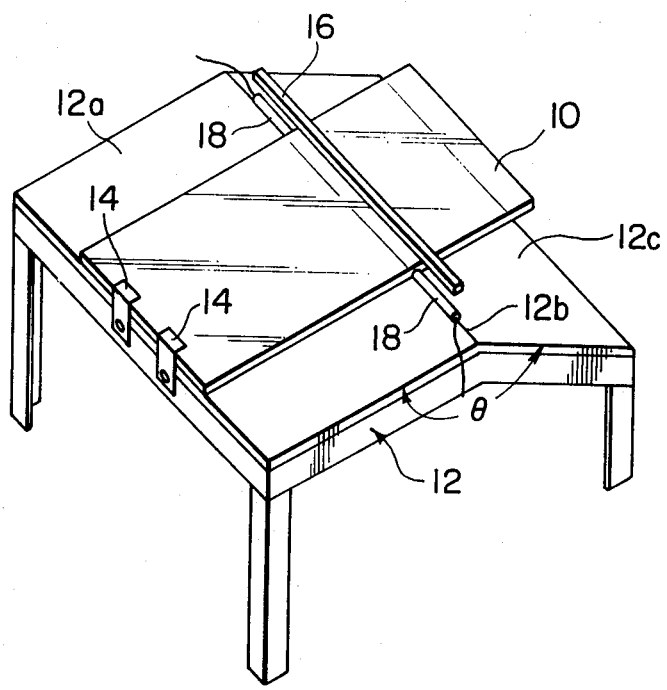
FIG. 1 is a perspective view of an apparatus for bending a flat glass plate by a method of the invention.

Bending of a flat glass plate along a straight line as the simplest embodiment of the invention will be described with reference to FIGS. 1 and 2.

Indicated at 10 is a flat glass plate to be bent. This glass plate 10 may be assumed to be an about 5 mm thick rectangular plate measuring about 40 cm by 50 cm, though there is no particular restriction to the initial shape and size of a glass plate to be bent by a method of the invention. A bending die 12 for bending the glass plate 10 takes the form of a table. The top of this table-like die 12 is divided into a horizontal area 12a and a sloping area 12c such that the border of the two areas 12a and 12c gives a straight edge 12b. The incline of the sloping area 12c is determined such that the two areas or planes 12a and 12c form an angle $\theta$ which agrees with the intended bending angle for the glass plate 10. The glass plate 10 is placed on the horizontal area 12a of the die top and held securely by suitable clamping devices 14 such as vices, clips or angled rests in such a position that a bending line (along which the glass plate 10 is intended to be bent) overlaps the edge 12b. As a result, a portion of the glass plate 10 protrudes beyond the edge 12b to lie above and spaced from the sloping area 12c of the die top.

An electric heater 16 in the shape of a straight bar or rod is provided above and very close to the glass plate 10 so as to extend along the edge 12b of the die 12. The length of the heater 16 is somewhat greater than the width (in the direction of the aforementioned bending line) of the glass plate 10. In addition, a pair of electrodes 18 are kept in contact with two parallel side faces of the glass plate 10, respectively, at locations where terminates the bending line. In other words, the bending line extends from one of the electrodes 18 to the other. The electrodes 18 are connected to a high voltage (e.g. some thousand voltage) power supply (not shown).

In a method of the invention there is the need of heating the glass plate 10 over its entire area to accomplish bending of the glass plate 10. By way of example, such heating is effected by confining the apparatus of FIG. 1 in an electric furnace 20 having a heater 21 in an upper position as shown in FIG. 2.

Using the above described apparatus, the glass plate 10 is bent along the edge 12b of the die 12 in the following way.

The temperature of the furnace 20 is raised so as to heat the glass plate 10 entirely to a temperature of about 350°–450° C., i.e. a temperature a few hundred degrees below the softening point of the glass, and simultaneously a current is made to flow through the heater 16 to heat the glass plate 10 more intensely only in a narrow zone containing the bending line. As the result, only this narrow zone of the glass plate 10 is heated to a temperature of about 500°–540° C., i.e. a temperature still below the softening point of the glass but considerably above the temperature (350°–450° C.) of the remaining area. The mild heating of the entire glass plate 10 facilitates an intense heating of the bending zone and, as a matter of more importance, prevents breakage of the glass plate 10 attributed to a significantly great difference in temperature between the bending zone and the remaining area.

The local heating by means of the heater 16 results in that the electric resistivity of the glass plate 10 in the intensely heated zone becomes distinctively lower than in the remaining portion. In other words, an electrical conduction path appears in the glass plate 10 as a linear path extending along the edge 12b from one of the two electrodes 18 to the other.

When this manner of heating is achieved, a voltage of, for example, 5000 V is applied to the electrodes 18. Because of a considerably lowered resistivity of the glass plate 10 in the intensely heated zone, the application of such a high voltage to the electrodes 18 causes a current of about 0.7–0.9 A to flow between the electrodes 18 through the glass plate 10. Then only the bending zone is heated still further by the Joule effect of this current with the result that the temperature of the bending zone reaches the softening point of the glass, about 720° C. for example, while the remaining area of the glass plate 10 remains at temperatures below or not appreciably higher than about 450° C. The temperature rise caused by the application of voltage to the electrodes 18 exhibits acceleration since the resistivity of the glass lowers, and hence the current intensifies, as the temperature rises. To prevent excessive softening of the glass plate 10 in such intensely heated zone as will cause an unwanted deformation of the glass plate 10, the intensity of the current flowing through the glass plate 10 is regulated by gradually lowering the voltage applied to the electrodes 18 as the temperature of the bending zone rises.

Thus, it is realized to sufficiently soften the glass plate 10 only in a linear zone which is narrow in width and contains the intended bending line in its entire length.

Since the softened zone of the glass plate 10 loses rigidity, the right-hand portion of the glass plate 10 can no longer remain horizontal but droops on account of its dead weight towards the sloping surface 12c of the die 12. The drooping continues until this portion of the glass plate 10 rests on the sloping surface 12c. As a consequence, the glass plate 10 is bent along the edge 12b of the die 12 to form the intended angle θ. Upon completion of the bending, the heater 16 is switched off and the application of voltage to the electrodes 18 is ceased. Because of the local softening of the glass plate 10 and the utilization of the edge 12b as a bending pattern, the fold or bend (given along the edge 12b) of the thus bent glass plate has such a small radius of curvature as is approximately equivalent to the thickness of the glass plate 10. If it is desired to accomplish the bending with a relatively large radius of curvature, the desire will be satisfied by making the edge 12b rounded.

As will be understood, the heating of the entire area of the glass plate 10 needs not to be accomplished with high precision or very good uniformity. It is permissible that the temperature of the glass plate 10 in areas other than the bending zone (the intensely heated zone) becomes lower as the distance from the bending line (or edge 12b of the die 12) becomes longer.

To preclude that the contact of the electrodes 18 with the softened zone of the glass plate 10 might cause injury to or distortion of the glass plate 10, the electrodes 18 are so shaped as to make contact with the side faces of the glass plate 10 each at a surface small in area and smooth in finish. Preferably, each of the electrodes 18 takes the form of a thin rod whose one end is so shaped and finished as to give a contact surface, and a heat- and rust-resistant material such as stainless steel, molybdenum, platinum or graphite is used as the material of the electrodes 18, at least in their endmost portion containing the contact face. Of course it is undesirable to press the electrodes 18 against the glass plate 10 with a great force.

Following the above described bending process, the current through the heater 21 of the furnace 20 is regulated in order that the bent glass plate is annealed through a gradual temperature reduction to room temperature and becomes free from strains upon completion of the cooling. If it is wished to effect tempering of the bent glass plate, the current through the heater 21 may be once intensified after the bending process so as to heat the bent glass entirely to a temperature a little below the softening point, to 630° C. for example, followed by rapid cooling of the heated glass plate.

Figure 2:
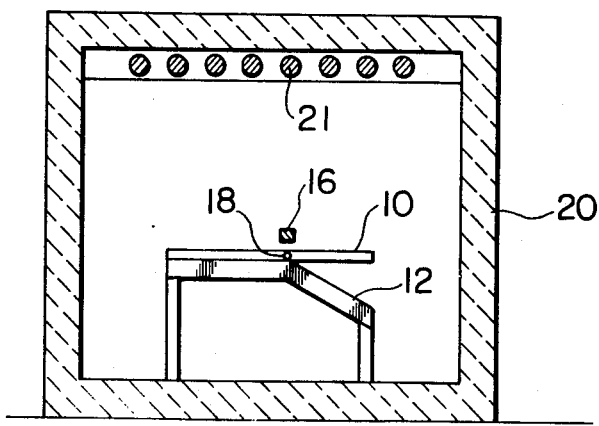
FIG. 2 is an elevational section of a furnace in which is placed the apparatus of FIG. 1.

FIG. 4 shows an angled glass plate 10' having a linear fold 10a as the product of the bending method illustrated in FIGS. 1 and 2.

The design of the bending die 12 shown in FIG. 1 should be taken as merely exemplary. It will be self-evident that a method of the invention is allowed to utilize an optionally designed bending die in compliance with the shape of a glass plate to be bent and the design of the intended product. Furthermore, it is possible to bend a glass plate along a curved line by a method of the invention. In this case, a heating means (corresponds to the heater 16 in FIG. 1) for intensely heating a limited zone of the glass plate is made to have a curved shape or arrangement in accordance with the intended curvedness of the bending line. Of course use is made of a correspondingly designed bending die. The electrodes 18 need no modification in their shape and arrangement since a locally intensified heating of the glass plate by a curved heater gives a curved path for an electric current in the glass plate. The heater 16, or its alternative for heating along a curved line, needs not to be an electric heater but may be a gas burner or the like.

FIG. 3 shows a slight modification of the apparatus of FIG. 1 as an example of apparatus for bending a curved glass plate. In this case it is intended to bend a curved glass plate 100 along a slightly curved line by the use of a table-like bending die 22. The top of this table-like die 22 is almost entirely curved but is divided into a nearly horizontal area 22a and a generally downwardly sloping area 22c such that the border of the two areas 22a and 22c gives a rounded edge or ridge 22b, which is curved or arcuated in plan view in accordance with the intended curvedness of a bending line. The heater 16 for intensely heating a bending zone of the glass plate 100 is similarly arcuated and held above the ridge 22b. The glass plate 100 is placed on the die 22 and heated (using the electrodes 18, too) in the same way as in the case of bending the flat glass plate 10 by the use of the apparatus of FIG. 1.

It will be understood that the apparatus of FIG. 1 or 3 can easily be modified so as to bend the glass plate 10 or 100 along two spaced lines at the same time by altering the design of the die 12 or 22 and supplementing another heater (16) and another pair of electrodes (18) for the second bending line. FIG. 5 shows, by way of example, a glass object 100' obtained by bending a curved glass plate along two bending lines 100a spaced from each other.

What is claimed is:

1. A method of bending a glass plate along a line traversing the glass plate, comprising the steps of:
   (a) providing a pair of electrodes in contact with the glass plate respectively at two terminals of said line;
   (b) heating a substantially entire portion of the glass plate by first heater means arranged in spaced-apart relationship with said glass plate so as not to cause softening of the glass plate;
   (c) heating the glass plate more intensely only in a zone which traverses the glass plate with a narrow width and contains the entire length of said line while step (b) is continued by the use of a second heater means arranged at a short distance from the glass plate to radiate heat along said line such that only said zone of the glass plate is heated to a temperature at which the glass plate does not yet soften but exhibits an appreciable lowering of its electrical resistivity;
   (d) applying a voltage to said electrodes to cause an electric current to flow between said electrodes through said zone of the glass plate while steps (b) and (c) are continued such that only said zone of the glass plate is further heated by the Joule effect of said current and softened; and
   (e) bending the glass plate while said zone remains softened so as to give a bend along said line contained in the softened zone.

2. A method as claimed in claim 1, wherein said voltage is controlled during step (d) to compensate for a decrease in the resistivity of said zone of the glass plate resulting from a rise in the temperature thereby to control the intensity of said current.

3. A method as claimed in claim 1, wherein the glass plate is heated on a bending die in such an arrangement that the accomplishment of step (d) leads to spontaneous commencement of step (e).

4. A method as claimed in claim 3, wherein said bending die has a first surface one border of which is equivalent to said line and a second surface which meets said first surface slantwise to share the entire length of said border, the glass plate being partly placed on said first surface such that said line overlaps said border and partly protrudes beyond said border to lie above and spaced from said second surface.

5. A method as claimed in claim 1, wherein said electrodes are each brought into contact with a side face of the glass plate.

6. A method as claimed in claim 1, 2, 3, 4 or 5 wherein said line is a straight line.

7. A method as claimed in claim 1, 2, 3, 4 or 5 wherein said line is a curved line.

* * * * *